US011155741B2

(12) United States Patent
Armstead et al.

(10) Patent No.: US 11,155,741 B2
(45) Date of Patent: Oct. 26, 2021

(54) METHOD OF ENHANCING HYDRATION OF VISCOSIFIERS USING CONTROLLED MECHANICALLY INDUCED CAVITATION

(71) Applicant: Hydro Dynamics, Inc., Rome, GA (US)

(72) Inventors: Daniel A. Armstead, White, GA (US); Douglas G. Mancosky, White, GA (US)

(73) Assignee: Hydro Dynamics, Inc., Rome, GA (US)

( * ) Notice: Subject to any disclaimer, the term of this patent is extended or adjusted under 35 U.S.C. 154(b) by 79 days.

(21) Appl. No.: 16/148,833

(22) Filed: Oct. 1, 2018

(65) Prior Publication Data

US 2019/0169479 A1 Jun. 6, 2019

Related U.S. Application Data

(63) Continuation of application No. 15/135,745, filed on Apr. 22, 2016, now abandoned.
(Continued)

(51) Int. Cl.
*B01J 19/10* (2006.01)
*C09K 8/035* (2006.01)
(Continued)

(52) U.S. Cl.
CPC .......... *C09K 8/035* (2013.01); *B01F 3/1221* (2013.01); *B01J 8/0015* (2013.01); *B01J 8/10* (2013.01);
(Continued)

(58) Field of Classification Search
CPC ... B01F 3/1221; B01F 7/00816; B01J 19/008; B01J 2208/00575; B01J 2208/00867; B01J 8/0015
See application file for complete search history.

(56) References Cited

U.S. PATENT DOCUMENTS

| 1,758,207 A | 5/1930 | Walker |
| 2,283,244 A | 5/1942 | Walker |

(Continued)

FOREIGN PATENT DOCUMENTS

| JP | 55-102491 | 8/1980 |
| JP | 60-226594 | 11/1985 |
| JP | 62-213895 | 9/1987 |

OTHER PUBLICATIONS

International Search Report and Written Opinion for International Patent Application No. PCT/US2016/028873 dated Jul. 19, 2016.
(Continued)

*Primary Examiner* — Michael A Salvitti
(74) *Attorney, Agent, or Firm* — Womble Bond Dickinson (US) LLP

(57) ABSTRACT

A method of hydrating a dry powdered viscosifier such as a powdered polymer is disclosed. The method includes mixing the powdered viscosifier with a solvent such as water to form a mixture; moving the mixture through a cavitation zone; inducing energetic shock waves and pressure fluctuations in the mixture by mechanically inducing cavitation events within the mixture, the shock waves and pressure fluctuations untangling, separating, and straightening polymer molecule chains and distributing the chains throughout the mixture, and extracting the resulting hydrated viscosifier from the cavitation zone.

9 Claims, 2 Drawing Sheets

Related U.S. Application Data

(60) Provisional application No. 62/152,604, filed on Apr. 24, 2015.

(51) Int. Cl.

| | | |
|---|---|---|
| *B01J 13/00* | (2006.01) | |
| *B01J 8/10* | (2006.01) | |
| *B01J 19/00* | (2006.01) | |
| *B01J 8/00* | (2006.01) | |
| *B01F 3/12* | (2006.01) | |
| *B01J 8/20* | (2006.01) | |
| *B01F 7/00* | (2006.01) | |

(52) U.S. Cl.
CPC ............... *B01J 8/20* (2013.01); *B01J 13/00* (2013.01); *B01J 19/008* (2013.01); *B01F 7/00816* (2013.01); *B01J 2208/00575* (2013.01); *B01J 2208/00681* (2013.01); *B01J 2208/00805* (2013.01); *B01J 2208/00867* (2013.01)

(56) References Cited

U.S. PATENT DOCUMENTS

| | | | |
|---|---|---|---|
| 4,213,332 A | | 7/1980 | Bonomo |
| 4,529,794 A | | 7/1985 | Sortwell et al. |
| 4,864,872 A | | 9/1989 | Stahl |
| 5,183,513 A | | 2/1993 | Sajewski |
| 5,184,576 A | | 2/1993 | Sajewski |
| 5,188,090 A | | 2/1993 | Griggs |
| 5,239,948 A | | 8/1993 | Sajewski |
| 5,265,629 A | | 11/1993 | Sajewski |
| 5,380,411 A | * | 1/1995 | Schlief .................. A61K 49/223 |
| | | | 204/157.15 |
| 5,385,298 A | | 1/1995 | Griggs |
| 5,571,975 A | | 11/1996 | Smith et al. |
| 5,957,122 A | | 9/1999 | Griggs |
| 6,365,555 B1 | * | 4/2002 | Moser .................... B01J 19/008 |
| | | | 252/518.1 |
| 6,627,784 B2 | * | 9/2003 | Hudson ............... B01F 7/00816 |
| | | | 162/29 |
| 7,360,755 B2 | * | 4/2008 | Hudson ............... B01F 7/00816 |
| | | | 261/84 |
| 7,507,014 B1 | | 3/2009 | League et al. |
| 8,430,968 B2 | * | 4/2013 | Mancosky .................. C12P 7/10 |
| | | | 127/34 |
| 8,465,642 B2 | | 6/2013 | Kazem |
| 9,469,548 B2 | * | 10/2016 | Mancosky ........... B01D 9/0036 |
| 2007/0215346 A1 | * | 9/2007 | Sloan ..................... B01D 29/54 |
| | | | 166/250.01 |
| 2008/0167204 A1 | * | 7/2008 | Slabaugh .............. B01F 3/1207 |
| | | | 507/214 |
| 2013/0188295 A1 | * | 7/2013 | Chacko .................. C08G 75/06 |
| | | | 361/525 |
| 2016/0059194 A1 | * | 3/2016 | Smith ................. B01F 7/00816 |
| | | | 366/108 |
| 2016/0312099 A1 | * | 10/2016 | Armstead .................. B01J 8/10 |
| 2016/0339400 A1 | * | 11/2016 | Smith ................... F04D 29/406 |
| 2019/0169479 A1 | * | 6/2019 | Armstead ............. B01F 3/1221 |

OTHER PUBLICATIONS

International Preliminary Report on Patentability in International Patent Application No. PCT/US2016/028873 dated Nov. 2, 2017.

Smith, Kevin email chain to Krayer, Bill; Subject: Gum Hydration; Date: Jul. 10, 2021

Fax Cover Sheet and letter from John W. Wustenberg, Halliburton Energy Services, Inc. to Mr. Kevin W. Smith, The Total Fluid Solutions Company; Subject Halliburton U.S. Appl. No. 11/621,407 , dated Jun. 2, 2009

Letter from Kevin W. Smith, Total Separation Solutions, LLC, Kenda Capital, Shell Technology Ventures Fund 1, B.V. and Kelly Hudson, Hydro Dynamics, Inc. to Halliburton, Subject—Attention Mr. Joe Sandy and Mr. Robert Kent, dated May 14, 2009

SPX Corporation; *The APV Cavitator*; Brochure—Issued Oct. 2011—5003-01-10-2011-US; Copyright 2011, 2013 SPX Corporation.

SPX CORPORATION; *APV Cavitator Technology in Hydration of Hydrocolloids and Proteins*; Brochure—Issued Apr. 2013—16021-01-4-2013-US; Copyright 2013 SPX Corporation.

SPX CORPORATION; *APV Cavitator Technology in Functionalization of WPC and other Food Ingredients*; Brochure—Issued May 2013—16024-01-05-2013-US; Copyright 2013 SPX Corporation.

SPX CORPORATION; *APV Cavitator Technology for Ice Cream Mix Production*; Brochure—Issued Feb. 2013—16019-01-02-2013; Copyright 2013 SPX Corporation.

SPX CORPORATION; *APV Cavitator Technology for Toothpaste Production*; Brochure—Issued Feb. 2013—16018-01-02-2013; Copyright 2013 SPX Corporation.

SPX CORPORATION; *APV Cavitator Technology in Personal Care Processing*; Brochure—APV-16028 Version 01/2013 Issued Jul. 2013; Copyright 2013 SPX Corporation.

\* cited by examiner

Hydrated Polymer Chains

Conventional        SPR Treated

METHOD OF ENHANCING HYDRATION OF VISCOSIFIERS USING CONTROLLED MECHANICALLY INDUCED CAVITATION

REFERENCE TO RELATED APPLICATION

This is a continuation of U.S. patent application Ser. No. 15/135,745 filed on Apr. 22, 2016, which claims priority to the filing date of U.S. provisional patent application 62/152,604 entitled Method of Enhancing Hydration of Viscosifiers Using Controlled Mechanically Induced Cavitation and filed on Apr. 24, 2015. The contents of these patent applications are hereby incorporated by reference.

TECHNICAL FIELD

This disclosure relates generally to hydration of natural and synthetic polymers, gums, and other viscosifiers and more specifically to enhancing or increasing the efficiency and effectiveness of such hydration using controlled mechanically induced cavitation.

BACKGROUND

Viscosity increasing agents are used in many industries from personal care products, to food, to waste treatment, to fossil fuel (oil) drilling muds. Such agents when mixed with a working fluid function to increase or otherwise affect the viscosity or flow characteristics of the fluid so that the fluid is better suited for an intended use. For example, when preparing drilling mud for use in oil drilling operations, a specific viscosity of the mud is desired to maximize the ability of the mud to, for instance, provide a desired hydrostatic pressure; cool and lubricate the drill head assembly; suspend, carry away, and release cuttings; and other functions.

Dry or powdered viscosifiers, which may be natural or synthetic, commonly are used in many industries to prepare viscosity increasing agents. In most cases, a dried polymer powder is used. A small amount of polymeric powder such as guar, starch, cellulose, carageenan, xanthan, or acrylic is first hydrated before being used to thicken a fluid. Polymer powder consists of small powder particles wherein the individual polymer molecule chains are often tangled, folded, and compacted together. Hydration of the powdered polymer is nothing more than mixing the powdered polymer thoroughly with water to expand, separate, untangle, and solubilize the polymer chains. As the polymer hydrates, its molecules unfold into long chains, which increase fluid viscosity. It is important to hydrate the polymer completely without breaking or damaging the polymer chains with excess shear forces in the mixing process in order to achieve maximum viscosity improvement and product quality at minimum cost.

Conventional technologies for hydrating polymers to produce viscosifiers generally include mixing powdered polymer with water in a bulk mixer and then allowing the mixture to age in an ager before being added to a fluid to be viscosified. Traditional mixers used for this process often expose the polymer molecules to high shear stresses, which can damage and break apart a significant portion of the polymer molecule chains. To address this problem, traditional polymer hydrators often attempt reduce polymer chain damage using additional process steps such as, for instance, conducting hydration at elevated temperatures, mixing more slowly for long periods of time, adding secondary solvents to the mixture, or simply adding excess polymer to make up for damage and consequent incomplete hydration. Conventional hydration processes also can result in inferior end product quality in the form of a liquid having lumps of un-hydrated powder surrounded by hydrated powder referred to as "fish eyes" in the industry. Such fish eyes are detrimental in many ways, including waste of polymer not contributing to viscosity, cleaning issues, and lack of homogeneity in the final product.

A need exists for an improved method and apparatus for hydrating or activating powdered polymers in the production of viscosifiers that produce an extraordinarily homogeneous and high quality end product with minimum clumping and minimum polymer chain damage, and all without adding cost or process steps to the method. It is to the provision of such a method and an apparatus for carrying out the method that the present invention is primarily directed.

SUMMARY

Briefly described, an improved method is disclosed for hydrating or activating a viscosity enhancing substance such as a powdered polymer to produce a more effective viscosifier. The method includes subjecting a mixture of polymer powder and water or other solvent to intense cavitation-induced pressure fluctuations in a very low shear controlled cavitation environment. This greatly improves the completeness of hydration and results in minimum damage to the resulting hydrated polymer chains. The cavitation induced pressure fluctuations serve to straighten, untangle, and stretch the polymer chains more fully, resulting in more complete hydration and viscosity development when compared to conventional shear mixing. The very low shear forces results in far less polymer chain breakage and damage than conventional hydration techniques thereby increasing the viscosity enhancing efficiency of the finished viscosifier. Also, the method is carried out without heating or adding secondary solvents and can be carried out at commercial flow rates in a continuous process. The result is a very high quality homogeneous viscosifier produced for low cost in commercially usable volumes. An apparatus for carrying out the method also is disclosed.

These and other aspects, features, and advantages of the invention disclosed herein will become more apparent upon review of the detailed description set forth below taken in conjunction with the accompanying drawing figures, which are briefly described as follows.

DETAILED DESCRIPTION

Figure 1:
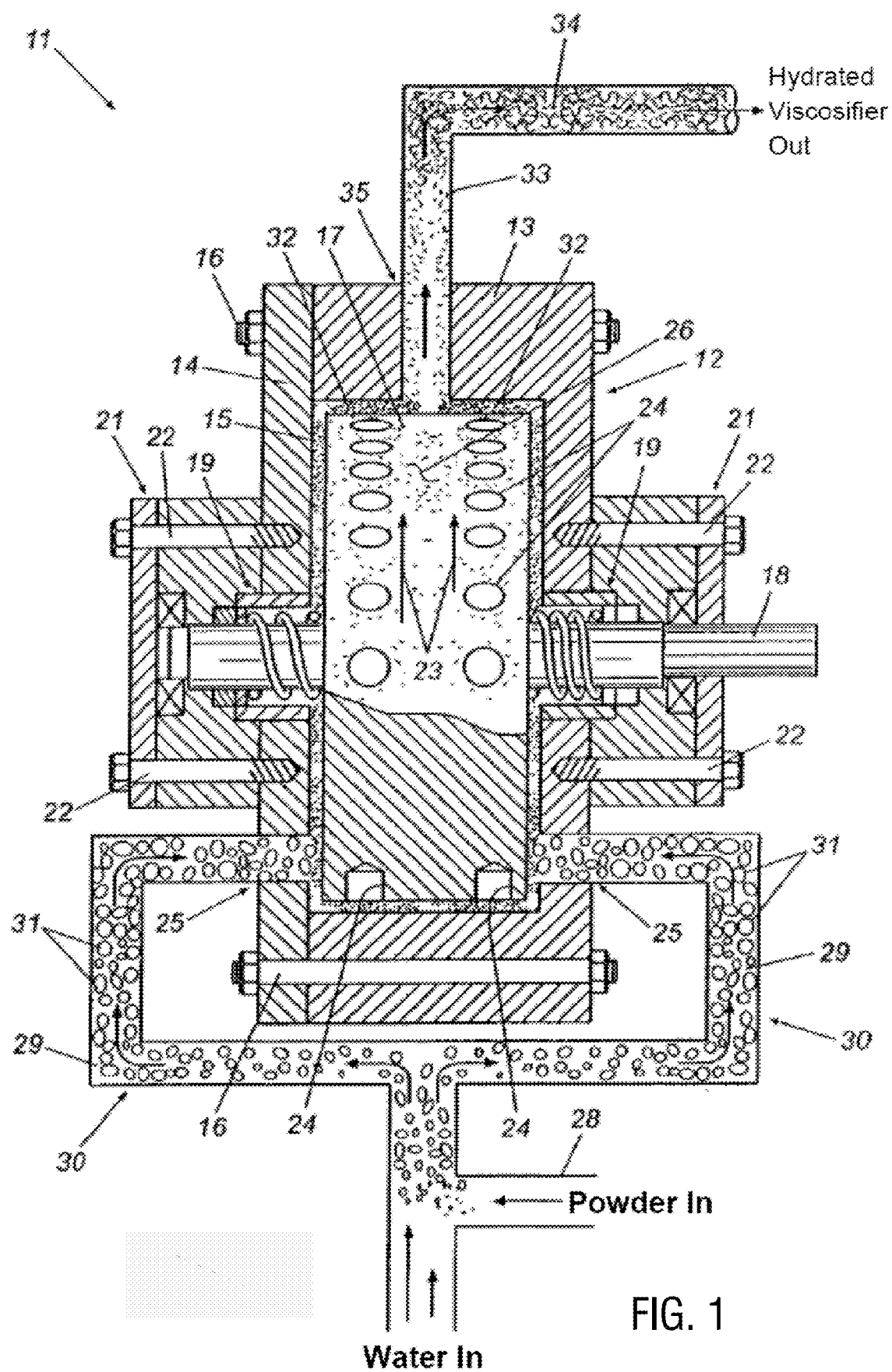
FIG. 1 is a schematic illustration showing one embodiment of an apparatus that can be used for carrying out improved hydration according to the method of the present invention.

FIG. 1 illustrates one embodiment of a controlled cavitation reactor suitable for carrying out the method of the present invention. The structure of the reactor is described in detail in U.S. Pat. No. 7,360,755; and that detailed description as well as the entire contents of the '755 patent is hereby incorporated by reference. The reference numerals in FIG. 1 are referred to in the incorporated '755 patent and need not be referred to again here. With the description of the apparatus of FIG. 1 from the '755 patent in mind, FIG. 1 illustrates that water is fed to the controlled cavitation reactor through a port that, in this case, is shown at the bottom of the drawing. While water is the most common substance used in hydration, it will be understood that the present invention is not limited to water but is intended to encompass other hydrating fluids, solvents, and mixtures thereof according to the demands of a particular application. With continued reference to FIG. 1, a powdered viscosifier is fed to the water flow through another port, which in FIG. 1 is shown at the bottom right of the figure. The powdered viscosifier, commonly a powdered or dehydrated polymer, mixes with and becomes entrained in the flow of water and the mixture enters the controlled cavitation reactor. The mixture flows from the sides of the spinning rotor in the reactor shown in FIG. 1 and through the space between the peripheral surface of the rotor and the cylindrical outer wall of the housing. This space is referred to the cavitation zone or the reaction zone.

As the rotor spins, highly energetic cavitation events are created in the mixture within the bores of the rotor and are continuously replenished within the bores. In a cavitation event, a low pressure zone forms a cavitation bubble in the mixture within a bore, and the bubble then collapses and releases a highly energetic shockwave. These shock waves propagate from the bores through the mixture as the mixture flows through the cavitation zone of the controlled cavitation reactor. This in turn sets up high energy microscopic and macroscopic pressure fluctuations within the mixture. The shockwaves and pressure fluctuations first separate and disperse individual particles of powder within the mixture allowing solvent ($H_2O$ molecules) to contact the powder particles on all sides. This maximizes the surface area contact between solvent molecules and polymer chains. As the polymer chains in the particles begin to hydrate with solvent, the pressure fluctuations drive the water molecules into and out of the particles. This, in turn, detangles, releases, separates, and straightens the individual polymer molecule chains found in each particle of the powder.

Cavitation pressure fluctuations are controlled by controlling the rotation rate of the rotor and other variables so that maximum straightening, separation, and untangling of polymer chains occurs without covalent bond breakage and polymer chain cision. Virtually complete separation and straightening of the polymer chains is achieved with minimum damage to the chains, resulting in maximum viscosity development. In addition, the low shear environment within the cavitation zone compared to conventional hydration mixers greatly reduces polymer chain breakage. This results in a maximum number of longer polymer chains within the resulting viscosifier, which in turn improves the viscosity enhancing properties of the viscosifier with a minimum use of powder.

Figure 2:
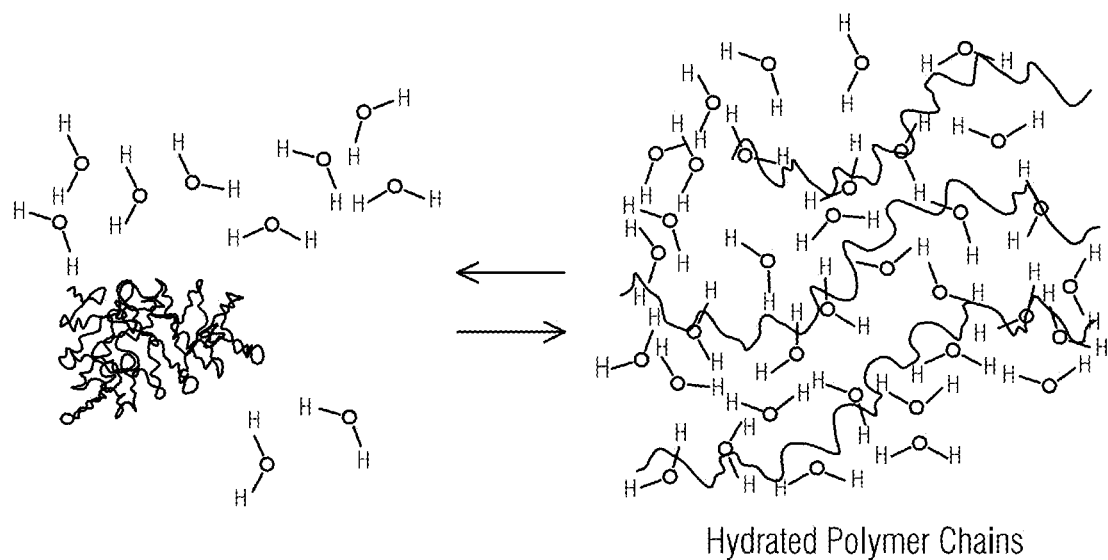
FIG. 2 is a schematic illustration of how polymer chains of a polymer powder are detangled, separated, and relaxed during the hydration methodology of the present invention.

FIG. 2 illustrates the hydration process schematically. On the left, $H_2O$ molecules are seen surrounding a particle of polymer powder. As mentioned above, the particle has been separated and segregated from other powder particles by high energy pressure variations in the cavitation zone so that the $H_2O$ molecules can surround the particle completely. The polymer chains within the particle are bunched together, folded and convoluted, and entangled with each other. As the mixture is exposed to cavitation induced pressure fluctuations, the $H_2O$ molecules are forced by the fluctuations and shock waves into and out of the bunched up polymer chains within the powder particle. This very efficiently untangles and separates the polymer chains, straightens them, and disburses them through the mixture. This result is illustrated on the right in FIG. 2. As mentioned, the untangling, separation, and straightening resulting from the method of the present invention is substantially more effective than prior art hydration techniques. The inherently low shear environment within the cavitation zone minimizes polymer chain breakage.

Conventional hydration can also result in inferior product quality with lumps of un-hydrated powder surrounded by hydrated powder referred to as "fish eyes" in the industry. These are detrimental in many ways including waste of polymer powder not contributing to viscosity, cleaning issues, and lack of homogeneity in the final product. With the method of the present invention "fish eyes" are obliterated by the highly energetic shock waves and pressure fluctuations within the cavitation zone, allowing for separation, disbursement, and hydration of the powder and chains within the fish eyes. Thus, lost viscosity due to fish eye formation and the general lack of homogeneity resulting from traditional hydration techniques is eliminated.

Figure 3:
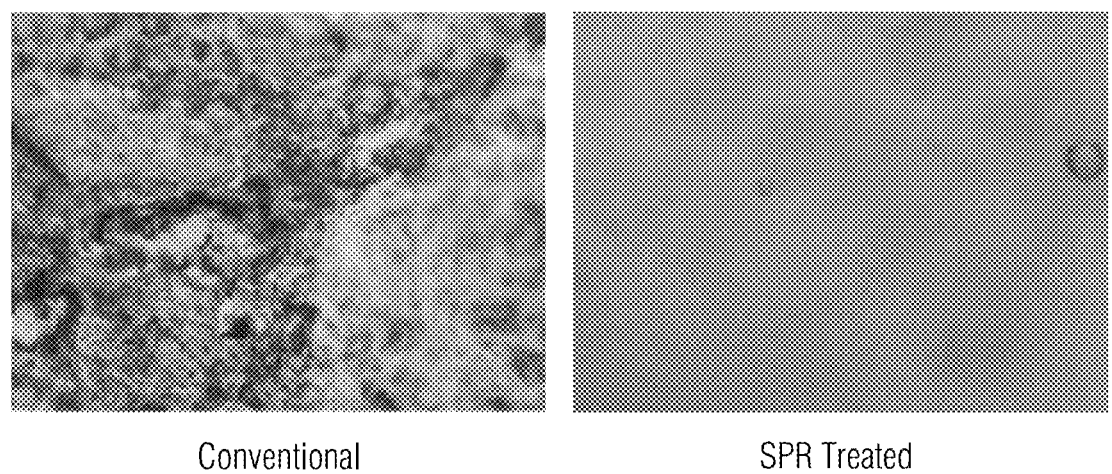
FIG. 3 is a photomicrograph comparing the homogeneity or quality of a hydrated polymer resulting from a traditional hydration method with the homogeneity of the same hydrated polymer using the improved method of the present invention.

FIG. 3 shows two photomicrographs of a hydrated polymer. The image on the left in FIG. 3 shows a hydrated polymer resulting from a traditional mixing and aging technique commonly used for achieving hydration. It is clear in this image that the resulting viscosifier product lacks homogeneity and contains un-hydrated fish eyes that detract from the effectiveness of the product. Not visible in the left image are the broken and damaged polymer chains that have resulted from the relatively high shear forces to which the mixture is subjected in a traditional hydration mixing process. The image on the right in FIG. 3 is a photomicrograph of the end product hydrated in a controlled cavitation reactor according to the method of the present invention. The product is seen to be far more homogeneous than the product in the left image with very few if any clumps and fish eyes to detract from the effectiveness of the product. Also not visible in the right image are the straight, separated, and uniformly disbursed polymer chains that exhibit very little damage and breakage due to shear forces.

In commercial use, the controlled cavitation reactor of this invention can be attached as a side stream of an already existing batch hydration process. Alternatively, it can be part of a continuous hydration process acting upon dry powders mixed with water or another solvent or slurries of polymers and other viscosity inducing agents. One advantage of the present invention is that the requirement of aging after mixing that is an integral part of many traditional hydration techniques is eliminated. With the present invention, the end product emerges directly from the controlled cavitation reactor fully hydrated and ready to use.

Lab results have shown an increase in hydration yield of 20-30% with the method of the present invention over traditional hydration techniques. Contact time between particles of powder and the energy applied (which is directly proportional to the rotation rate of the rotor) have proven to be critical factors. Fortunately, the cavitation reactor of the present invention can be controlled precisely and easily to establish and maintain virtually any dwell time and energy input for maximizing the hydration process.

Using the microscopic and macroscopic pressure fluctuations of cavitation according to the method of this invention allows for many benefits in hydration. Some of these benefits include:

Cost reduction and/or increased viscosity due to higher hydration yield

Elimination or reduction of the need for costly secondary solvents

Reduced temperatures required for complete hydration

Less shear damage due to the low shear environment of the cavitation zone

Improved homogeneity and thus quality of the final product

Many parameters may be varied during the process described above to control the rate of hydration. For example, temperature may be varied as well as rotor speed and concentration of powder within the mixture. It has also been found that gum powder particulate grind size also can be varied and that such variations affect the rate at which viscosifiers are hydrated.

The invention has been described herein in terms and within the context of preferred embodiments and methodologies considered by the inventor to represent the best modes of carrying out the invention. It will be clear to the skilled artisan, however, that a wide gamut of additions, deletions, and modifications both subtle and gross might be made to the illustrative embodiments presented herein without departing from the spirit and scope of the invention.

What is claimed is:

1. A method of enhancing hydration of a non-hydrated viscosifier containing particles, the method comprising the steps of:
   (a) obtaining a powdered non-hydrated viscosifier to be hydrated;
   (b) obtaining a fluid solvent to be used to hydrate the powdered non-hydrated viscosifier;
   (c) introducing a flow of the fluid solvent into a controlled cavitation reactor having a generally cylindrical housing containing a cylindrical rotating rotor, the housing having an internal cylindrical wall and the rotor having a peripheral surface with radial bores spaced from the internal cylindrical wall to define a cavitation zone therebetween;
   (d) feeding the powdered non-hydrated viscosifier into the flow of the fluid solvent such that the powdered non-hydrated viscosifier becomes entrained within the solvent and mixes therewith to produce a mixture;
   (e) feeding the mixture into the cavitation zone of the cavitation reactor;
   (f) rotating the rotor of the cavitation reactor for generating cavitation events within the mixture resulting in shock waves and cavitation induced pressure variations that propagate through the mixture sufficient to substantially separate and disperse particles of the powdered particles within the mixture;
   (g) controlling the rotor rotation rate of the cavitation reactor, with the rotor rotation rate limited in view of a concentration of the powdered non-hydrated viscosifier within the fluid solvent, and controlling one or more of a dwell time of the exposure of the particles to the shock waves and cavitation pressure variations, an energy input, clearance between the rotor and the housing, a temperature, a concentration of the mixture, or a particulate grind size, so as to create a low shear environment wherein the particles of the powdered non-hydrated viscosifier are surrounded by the solvent and subjected to the shockwaves and cavitation induced pressure variations as polymer chains within the particles of the powdered non-hydrated viscosifier are hydrated with the solvent sufficient to maximize straightening, separation, and untangling of the polymer chains of the powdered non-hydrated viscosifier particles without causing covalent bond breakage or polymer chain scission;
   (h) as a result of steps (f) and (g), forcing solvent molecules into and out of particles of the powdered non-hydrated viscosifier to separate, untangle, straighten, and hydrate viscosifier molecule chains contained within the particles of the powdered non-hydrated viscosifier;
   (i) distributing the untangled, straightened, and hydrated viscosifier molecule chains substantially homogeneously throughout the mixture; and
   (j) collecting the resulting mixture.

2. The method of claim 1 wherein in step (a) the viscosifier comprises a polymer.

3. The method of claim 2 wherein the polymer comprises dehydrated polymer chains.

4. The method of claim 1 where in step (b) the solvent comprises water containing $H_2O$ molecules.

5. The method of claim 1 wherein step (d) comprises moving the mixture through the cavitation zone of a controlled cavitation reactor.

6. The method of claim 1 further comprising bores formed in the peripheral surface of the rotor, and wherein step (d) comprises rotating the rotor within the housing with the mixture within the cavitation zone.

7. The method of claim 1 further comprising the step as a result of steps (d) and (e) of breaking up lumps of viscosifier particles to minimize fish eyes in the mixture.

8. The method of claim 1 wherein combining the non-hydrated viscosifier and the solvent to produce a mixture comprises subjecting the non-hydrated viscosifier and the solvent to a batch mixing process to produce the mixture.

9. The method of claim 1 further comprising the step of subjecting the mixture to a batch mixing process following step (i).

* * * * *